Figure 3:
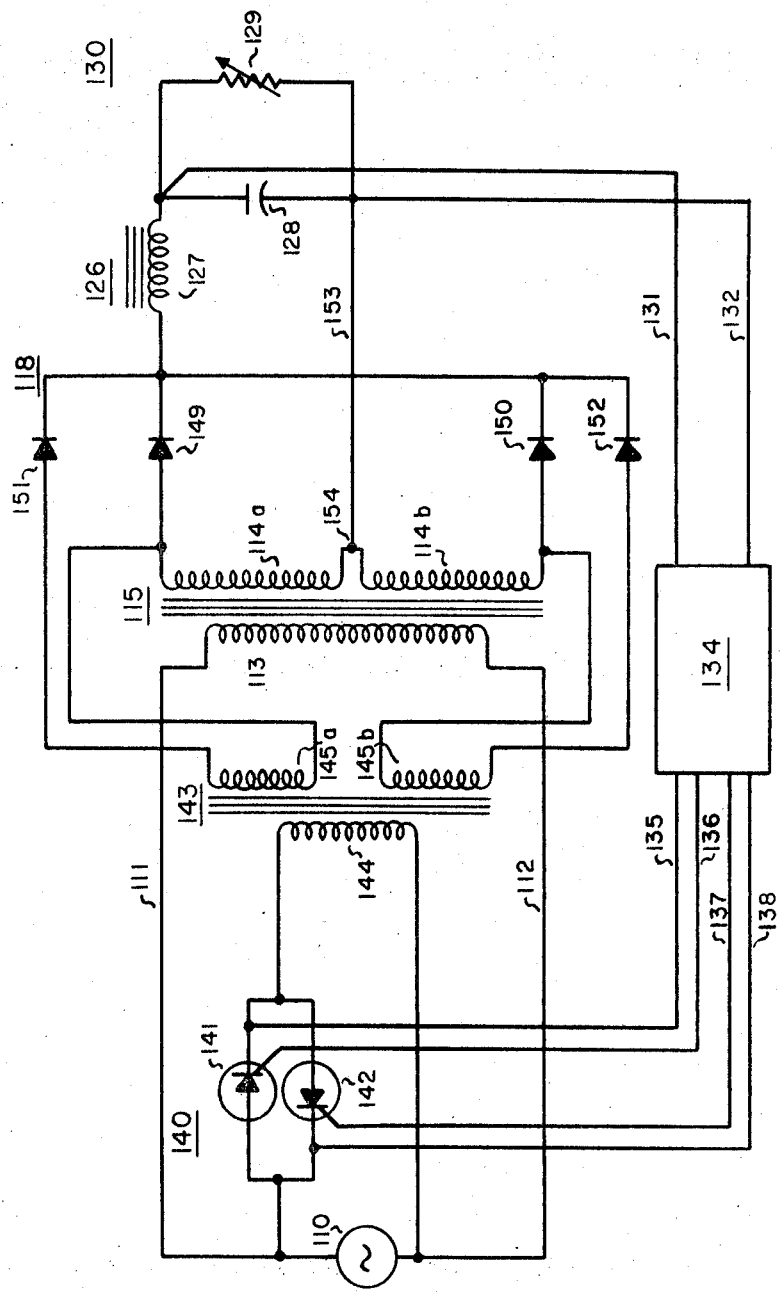

Sept. 30, 1969    W. H. BIXBY    3,470,444
CONTROL CIRCUIT FOR RECTIFIERS USING SILICON
CONTROLLED RECTIFIERS
Original Filed Sept. 24, 1963    4 Sheets-Sheet 1
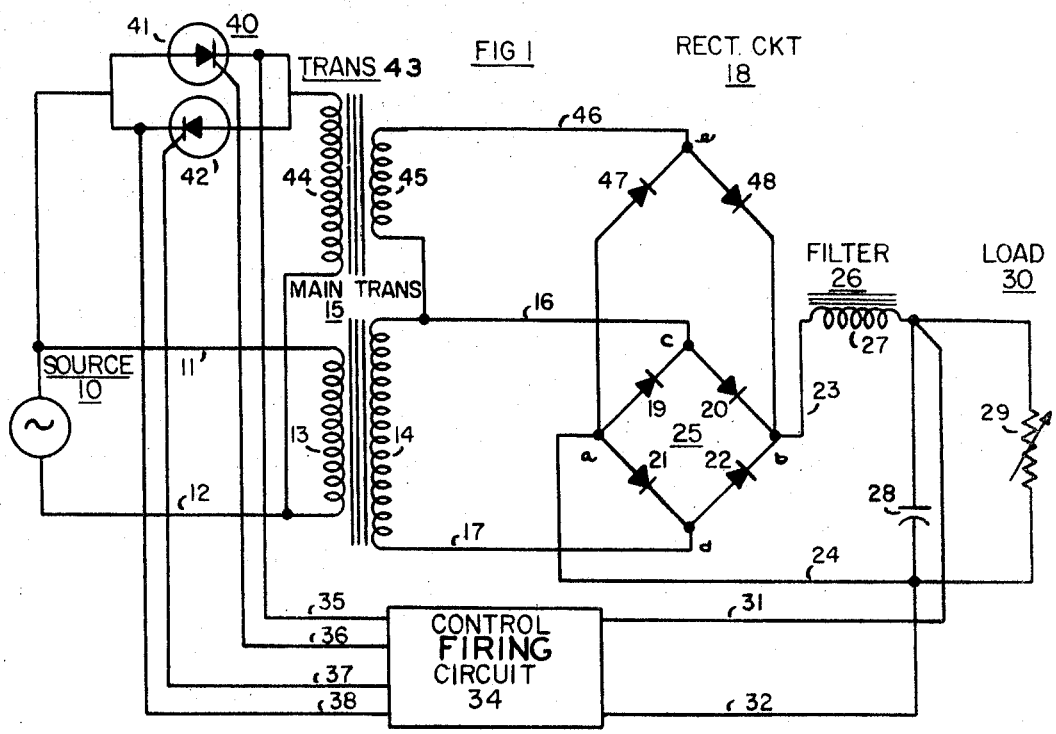
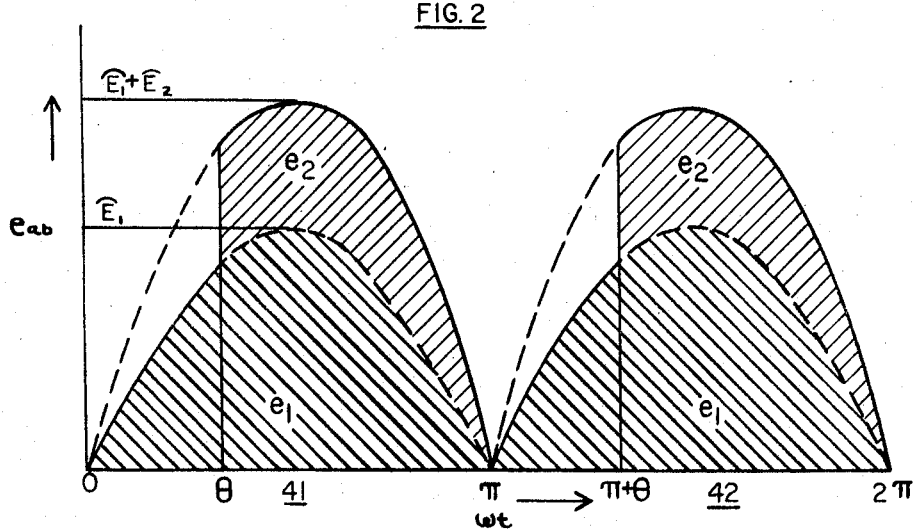

United States Patent Office 3,470,444
Patented Sept. 30, 1969

3,470,444
CONTROL CIRCUIT FOR RECTIFIERS USING SILICON CONTROLLED RECTIFIERS
William H. Bixby, Columbus, Ohio, assignor to North Electric Company, Galion, Ohio, a corporation of Ohio
Continuation of application Ser. No. 311,053, Sept. 24, 1963. This application June 21, 1967, Ser. No. 647,876
Int. Cl. H02m 7/12
U.S. Cl. 321—5     23 Claims The present invention relates to a novel control circuit for rectifier apparatus, and more specifically to a novel control arrangement for rectifier devices in which silicon controlled rectifiers are used to provide a constant direct current voltage output for a given range of voltage values.

This application is a continuation of application Ser. No. 311,053, filed Sept. 24, 1963, now abandoned.

In many fields, such as telephony, radio communication, rolling mills, motor control, electroplating, by way of example, a source of direct current power is required to energize the equipment. Since alternating current is frequently more readily available in most areas, it is conventional practice in such applications to provide rectifier equipment for the purpose of changing the available alternating current to direct current.

Generally speaking, a rectifier circuit must be capable of supplying a direct current output voltage which is maintained within reasonably close tolerances even with changes of input voltage and load current conditions. In one prior art rectifier arrangement which is designed to provide such manner of operation, a transformer supplies power from an alternating current source to a controlled rectifier which, in turn, supplies direct current to a load. Control means determine the voltage of the output load, and with variations in the load voltage, a control signal is provided to adjust the firing angle of silicon controlled rectifiers which constitute the rectifying means between the transformer and the load.

In such arrangements, the use of silicon controlled rectifiers is preferred over conventional types of rectifier devices, such as ignitrons, thyratrons, mercury arc rectifiers, and the like because of the reduced voltage drop which is experienced with silicon controlled rectifiers (a drop of less than a volt as compared to eight to twenty-five volts in the other known types of devices), increased reliability, and reduced maintenance of the apparatus by reason of extended life periods in use.

While such arrangement is preferable to other known types of rectifier circuits from an operational standpoint, the expense of a control circuit including silicon controlled rectifiers from an economical standpoint is frequently impractical, if not prohibitive. As an example, the cost of silicon controlled rectifiers in the present market in the size necessary to effect the control of high-current circuits, may be as much as twenty times the cost of an uncontrolled rectifying diode of corresponding current and voltage rating. Obviously the high cost of such units seriously limits the use of a control arrangement which would otherwise be preferred.

It is apparent that a reduction in the cost of the silicon controlled rectifiers of the size now required, or a reduction of the size of the silicon controlled rectifiers required for use in controlling the rectifier circuit (i.e., the cost of the silicon controlled rectifiers reduces rapidly with the size), would materially reduce the cost of the overall assembly, and thereby permit increased use and application of rectifier circuits of this improved type. It is an object of this invention to provide a novel less expensive rectifier circuit in which silicon controlled rectifiers of a reduced size are used in the primary of the transformer to effectively control high current output circuits.

The problem of providing such type arrangements is basically complicated by the fact that rectifiers capable of providing a high-power, direct-current output must normally include a transformer connected between the alternating current source and the rectifier circuit to provide an output current at the voltage desired. In such arrangement the silicon controlled rectifiers are controlled to vary the phase angle of the current flow to the transformer primary winding, and thereby the voltage output of the transformer to the rectifier device. It is possible in such connections, however, for the source voltage to be suddenly applied at phase angles near the zero point of the voltage wave, and excessive in-rush currents may occur. It can be shown, for example, that in such cases when $\omega t = \pi$ the flux in the iron core of the transformer when the voltage is passing through zero would be $$\Phi \text{ (core flux)} = \frac{2\hat{E}}{\omega N}$$

(where N=the number of primary turns), which is twice the normal steady-state, maximum value of the core flux. As a precautionary measure, it is therefore necessary to select the silicon controlled rectifiers of a size sufficiently large to accommodate an in-rush current of this larger value. The cost of the rectifier circuit thereupon becomes unreasonably disproportionate.

Another problem is experienced by reason of the fact that it is common in the design of transformers using grades of core material comparable to grain oriented silicon steel, to employ maximum instantaneous flux densities, under steady-state conditions, which are in the range of from 13,000 to 16,000 gauss for high line conditions of the primary voltage. It is quite apparent that if the primary winding is suddenly excited near the zero point of the primary voltage wave, the core will be driven to essentially complete saturation with only the ohmic resistance and air-core reactance of the primary winding acting to limit the instantaneous value of the current. The excessive in-rush current under such conditions is too great for silicon controlled rectifiers placed in series with the primary winding, and the silicon controlled rectifiers would fail due to the passage of excessive instantaneous current.

The ultimate saturation value for transformer iron is in the vicinity of 23,000 gauss with magnetizing ampere turns rising very rapidly above 20,000 gauss. An obvious solution to the problem of protecting silicon controlled rectifiers in the primary circuit from being exposed to excessive instantaneous currents at the time of initial circuit energization would be to design the transformers for maximum instantaneous steady-state flux densities no larger than 10,000 gauss. Unfortunately, such design increases the size of the transformer substantially over that which can be used if a 15,000 gauss density is permissible, and the excessive weight, size and expense may be found to be objectionable in a number of applications.

It is accordingly another object of the present invention to provide a control arrangement in which silicon controlled rectifiers of reduced size may be used in the control of transformers which are operative at the lower value of flux density to provide only a portion of the supply voltage for the rectifier circuit, whereby an overall rectifier assembly of reduced size, weight and cost is provided.

It is a specific object of the invention to provide a novel circuit including a main transformer (which represents the bulk of the transformer capacity) for operation at the higher flux density to provide the minimum desired load voltage, and a second booster transformer (which represents a smaller fraction of the total transformer capacity) which operates at the lower flux density to provide the voltage regulation between the minimum desired load voltage and the maximum load voltage, whereby a control circuit including the operational advantages incident to the use of silicon controlled rectifiers is provided at reduced cost.

A feature of such invention is the manner in which an improved telephone influence factor is obtained with such arrangement. That is, it is well known in the use of silicon controlled rectifiers the fast switching of the controlled rectifiers frequently introduces harmonics into the circuit which is controlled thereby. In certain applications, such as in the use of rectifier circuits for battery charging purposes in a telephone system, the undesirable harmonics resulting from the fast switching (known as the telephone influence factor in the art) may be introduced into the lines of the alternating current source, and by magnetic induction it produces disturbances in the telephone circuits.

In the present arrangement in which the silicon controlled rectifiers control connections of only the second booster transformers to the source, it has been found that a reduction in the telephone influence factor in the amount of as much as fifty percent may be accomplished, whereby a circuit of improved operating characteristics is provided.

It is yet another object of the invention to provide a control arrangement for a rectifier circuit in which silicon controlled rectifiers are connected to regulate the voltage output of various types of rectifier circuits in this novel manner including rectifier circuits energized by single phase and polyphase sources.

It is yet another object of the invention to provide a novel control arrangement of such type in which the total heat dissipation associated with the power rectifier diodes is independent of the firing angle for a given load current, whereby the improved form of control is achieved without an increase in volume of the rectifier assembly.

Figure 4:
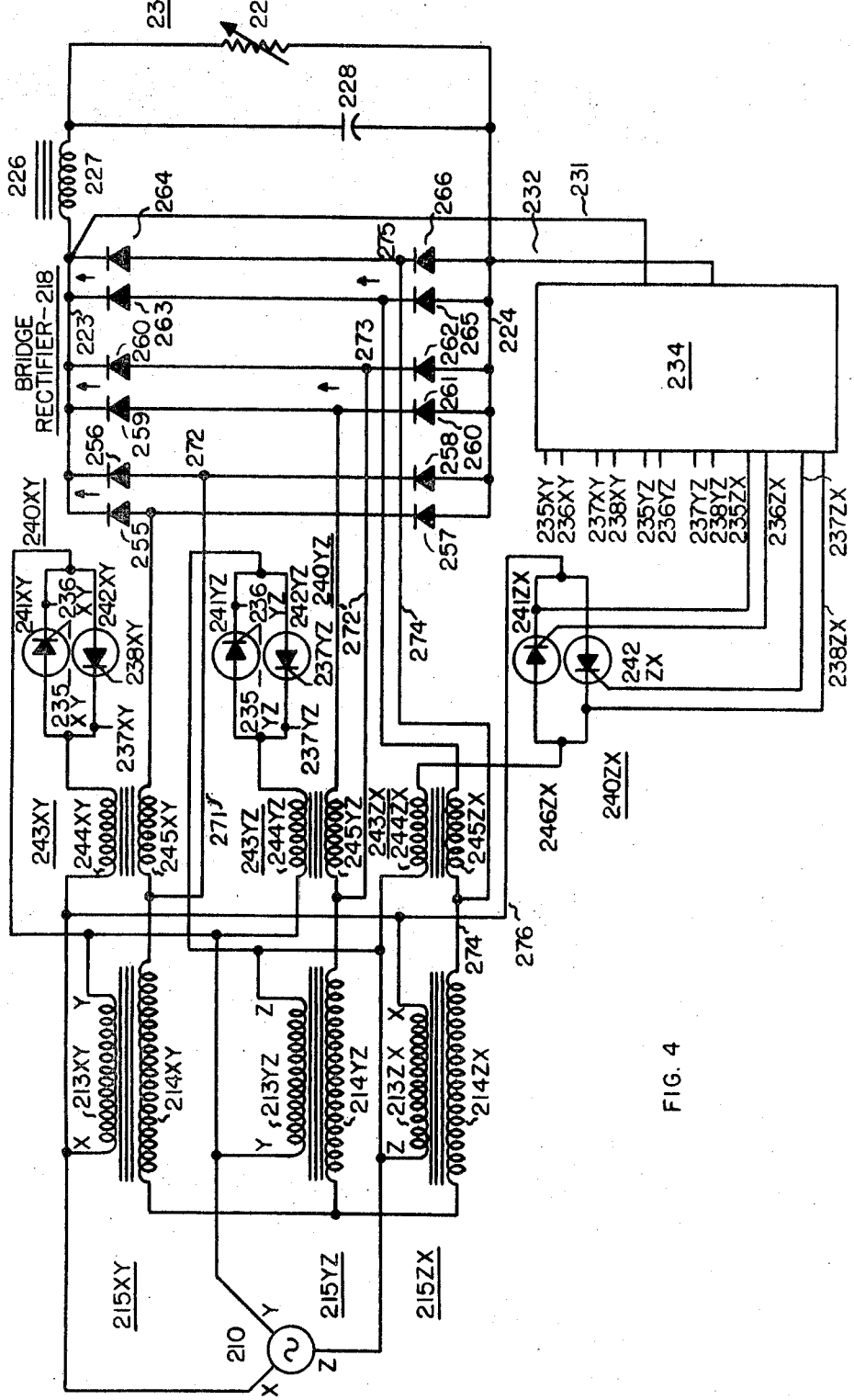
Figure 5:
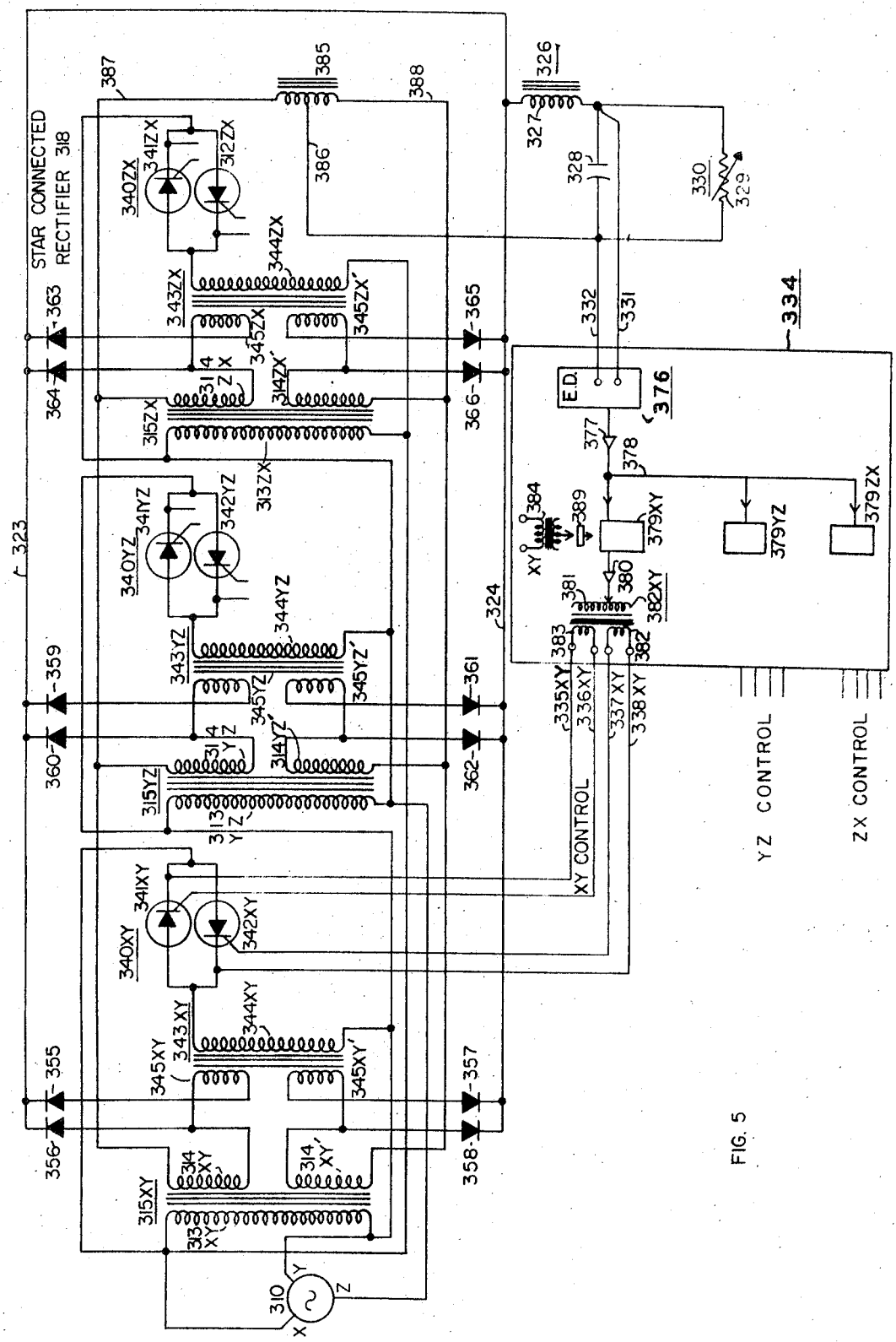

These and other advantages of the present invention will become apparent with reference to the following specification and accompanying drawings wherein basic embodiments of the structure are illustrated, and in which:

FIGURE 1 sets forth the novel control circuit as used in the control of a single-phase, bridge-type rectifier circuit;

FIGURE 2 is a waveform illustration of the voltage output provided by the rectifier circuit of FIGURE 1;

FIGURE 3 sets forth the novel circuit as used in the control of a single-phase, full-wave, center-tap rectifier circuit;

FIGURE 4 sets forth the novel circuit as used in the control of a bridge-type polyphase rectifier; and FIGURE 5 sets forth the novel circuit as used in the control of a polyphase, double-W rectifier circuit.

GENERAL DESCRIPTION

As noted above, in known arrangements silicon controlled rectifiers connected in the primary circuit of a transformer control the flow of current from an alternating current source to a rectifier circuit. In such arrangement, error detector means are connected to provide a signal representative of the load voltage, and an associated control circuit responsively varies the phase angle (or firing angle) of the silicon controlled rectifier in each cycle, whereby the output voltage of the rectifier circuit may be varied and controlled from its maximum value (zero angle of phase delay for the silicon controlled rectifiers) to zero output voltage (180 degrees of phase delay for the silicon controlled rectifiers).

However, it is well known that in many applications, it is only necessary that the output voltage be held within close limits for changes of input voltage and load current conditions which may be in the order of ten or twenty percent. In such arrangements the wide range of control provided by prior art arrangements, while not undesirable from an operational standpoint, is overly expensive. In the present invention, the control arrangement is such that it provides the required degree of control for applications in which narrower ranges of control are acceptable at a substantial reduction in equipment cost.

In general, the arrangements set forth in FIGURES 1 and 3–5 include a rectifier arrangement in which a first uncontrolled voltage supply means is operative to provide the minimum required voltage for a load, and a second or booster supply is used to provide an added voltage which raises the output voltage to the value necessary to maintain the voltage output constant as the load demand increases. Variation in the voltage supplied to the load between predetermined minimum and maximum values is provided by adjustment of the voltage output of the second supply.

With reference to FIGURE 1, the novel embodiment there shown basically comprises an alternating current source 10 for supplying alternating current over a main transformer 15 to a rectifier circuit 18. The rectifier output of rectifier circuit 18 is transmitted over a filter circuit 26 to a variable load 30. A control firing circuit 34 is connected across the load 18 and associated error detector means of known design are operative with variation of the load voltage from a predetermined value to correspondingly adjust the conducting period (or firing angle) of a pair of switches 41, 42 is control circuit 40, to thereby vary the period of connection of the alternating current source 10 to a second or booster transformer 43 and the value of the voltage supplied by transformer 43 to rectifier circuit 18.

As will now be shown, the main transformer 15 supplies the minimum required voltage from alternating current source 10 over rectifier circuit 18 and filter 26 to load 30. In the event that the minimum voltage is sufficient, the controlled switches 41, 42 will be maintained at cutoff. If the voltage of the source 10 or load 30 varies so that an increased voltage output is required from the rectifier circuit 18, control firing circuit 34 effects conduction of the switches 41, 42 in control circuit 40 at a phase angle in each half cycle to increase the voltage output of transformer 43 to rectifier circuit 18. Manifestly, the smaller the firing angle for the controlled switches the higher the output voltage supplied to the rectifier circuit 18.

As the load voltage demand decreases from the higher value, control firing circuit 34 adjusts the firing angle of the switches 41, 42 to occur at a later time in each half cycle to thereby reduce the voltage output of transformer 43. In this manner, control firing circuit 34 is operative to continually adjust the voltage output of transformer 43 to provide the desired constant voltage output with variation in voltage demand between the maximum voltage output of transformer 15 and the maximum voltage output of transformers 15 and 43.

SPECIFIC CIRCUIT DESCRIPTION

In more detail, the circuitry in one preferred embodiment shown in FIGURE 1 includes a main transformer 15 having a primary winding 13 connected over conductors 11, 12 to an alternating current source 10 which may be a conventional 110 volt alternating current source. A secondary winding 14 on main transformer 15 is connected over conductors 16 and 17 to input terminals $c$, $d$, of a bridge rectifier 25 in rectifier circuit 18 which includes four diodes 19–22 connected in the well known manner to provide a rectified full wave direct current output over output terminals $a$, $b$. As noted above, the primary winding 13 and secondary winding 14 of main transformer 15 are designed to have a number of turns necessary to provide the minimum output voltage desired for load 30.

The output terminals $a$, $b$, of the bridge rectifier 25 are connected over conductors 23, 24 and filter circuit 26 to load 30, filter 26 in the illustrated arrangement comprising an inductance 27 connected in series with the load, and a capacitor 28 connected in parallel with the load. The load 30 in the present disclosure is shown as a variable resistor 29. In one commercial embodiment the disclosed circuit would be used as a charging circuit for a battery such as used in telephone exchanges, and in such application, the load 30 would comprise a battery with its connected load.

A pair of conductors 31, 32 for control firing circuit 34 are connected across load resistor 29, and circuit 34 includes an error detector circuit of the conventional type which may include a potentiometer connected across conductors 31, 32 to provide a proportional voltage for comparison against a standard or reference voltage provided by a fixed voltage source, such as obtained from a Zener diode. Any variation between these voltages is referred to as an error or difference signal. Such circuits are well known. (See, for example, SCR Manuel, Second edition, published by General Electric, 1961).

Control firing circuit 34 is operative in accordance with the value of the error or difference signal to vary the signal coupled over output circuits 35, 36 and 37, 38 to thereby vary the firing time of a pair of switches 41, 42 in the switching circuit 40. In the present embodiment, the control switches comprise a pair of silicon controlled rectifiers 41, 42 connected in a parallel inverse manner between the alternating current source 10 and primary winding 44 of booster transformer 43, whereby one switch 41 operates in the positive half cycle, and the other switch 42 operates in the negative half cycle, the time of operation in their respective half cycles being determined by the time of receipt of the signal over circuits 35, 36 and 37, 38 from control firing circuit 34.

The secondary winding 45 of transformer 43 is connected over conductor 16 to terminal $c$ of bridge 25 and over conductor 46 and a unilateral conductive device, such as diode 48 to terminal $b$, and over conductor 46 and a unilateral conductive device such as diode 47 to terminal $a$. The manner in which main transformer 15 provides the minimum voltage required to the load 30, and the manner in which the circuitry is operative to energize booster transformer 43 for addition to the voltage of transformer 15 to thereby provide a constant voltage for the load 30 is now set forth in detail.

SPECIFIC OPERATION OF RECTIFIER CIRCUIT (FIGURE 1)

With reference to FIGURE 2, the waveform shown thereat sets forth the range of voltage output which may be obtained with the circuit of FIGURE 1. As there shown voltage $e_{a,b}$ (which represents the voltage output on the bridge rectifier conductors 23, 24) will never be less than voltage $e_1$ which is provided by the main transformer 15 over input terminals $c$, $d$ of bridge 25. During the positive half cycle diodes 20, 21 conduct, and during the negative half cycle diodes 19, 22 conduct to thereby provide a full wave direct current over output terminals $a$, $b$, and filter 26 to the load. The voltage output provided by the rectifier is the minimum voltage noted above (i.e., the voltage output of main transformer 15). In the event of a change in the voltage demands of the load 30, the changing signal value on conductors 31, 32 results in a corresponding error signal in control firing circuit 34 which in turn varies the time of firing of silicon controlled rectifiers 41, 42 respectively to effect a corresponding adjustment of the voltage output of transformer 43 to rectifier circuit 18.

More specifically, in the event that the voltage demand is increased, the control signal transmitted over output circuits 35, 36 and 37, 38 decreases the firing angle $\theta$ of silicon controlled rectifiers 41, 42 to effect firing of the rectifiers at an earlier time in their respective half cycles; and thereby an increase in current flow over primary winding 44 of transformer 43. The increased current flow in turn effects an increase in the RMS voltage which occurs in the secondary winding 45 and is coupled with the voltage output of transformer 15 to rectifier circuit 18.

During the positive half cycle, diode 20 conducts the load current until such time as the silicon controlled rectifier 41 conducts (firing angle $\theta$). At such time diode 48 conducts, and diode 20 is cut off, whereby the voltage output of transformer 43 is added to the voltage output provided by the main transformer 15 to provide a net voltage which maintains the load voltage at the desired value. During the negative half cycle diode 19 conducts the load current until such time as silicon controlled rectifier 42 conducts (firing angle $\pi+\theta$) at which time diode 47 conducts the load current and diode 19 is cut off.

In the event the load demand decreases control firing circuit 34 provides a signal over output circuits 35, 36 and 37, 38 to increase the firing angle $\theta$ of silicon controlled rectifiers 41, 42 and thereby delay the time of firing of the rectifiers in their respective half cycles whereby a reduced voltage output is provided by transformer 43 for addition to the voltage provided by transformer 15.

The voltage output of rectifier circuit 18 reduces correspondingly. As will be set forth in more detail hereinafter in the description relating to FIGURE 3, the provision of an arrangement in which the diodes, such as 19, 20, are inhibited whenever diodes 47, 48, respectively, conduct, comprises an important feature of the invention.

With reference once more to FIGURE 2, the waveform thereat illustrates the resultant voltage outputs of the rectifier combination at points $a$, $b$, for a specific firing angle $\theta$ as provided by control firing circuit 34 in response to a specific load demand.

It will be observed that in the event of a minimum voltage demand by the load, the firing angle $\theta$ will be $\pi$ (180°) and silicon controlled rectifiers 41, 42 will be inhibited from firing, whereby only the output waveform provided by the main transformer 15 (represented by $e_1$ in FIGURE 2) will appear at points $a$, $b$. The average rectified output voltage across the load for such condition of operation will be $$\frac{2\sqrt{2}}{\pi} E_1$$

in which $E_1$ represents the effective voltage, which may also be expressed $$\frac{2}{\pi} \hat{E}_1$$

in which $\hat{E}_1$ represents the maximum voltage.

In the event that the load demand is for the full voltage output of the rectifier circuit 18, the control firing circuit 34 provides a firing angle of $\theta=0°$ and silicon controlled rectifiers 41, 42 conduct for the entire period of their respective half cycles. In such event the waveform will be $e_1+e_2$ in which $e_2$ is the voltage provided by booster transformer 43, and the average rectified output voltage across the load will be $$\frac{2\sqrt{2}}{\pi}(E_1+E_2)$$

which may also be expressed as $$\frac{2}{\pi}(\hat{E}_1+\hat{E}_2)$$

The foregoing equations represent the minimum and maximum average rectified output voltage. Thus by varying the firing angle $\theta$ from $\pi$ to 0 the time average of the output voltage can be varied between the limits $$\frac{2}{\pi}\hat{E}_1 \text{ and } \frac{2}{\pi}(\hat{E}_1+\hat{E}_2)$$

Since the time of appearance of $e_2$ is variable by adjustment of the firing angle $\theta$ for the silicon controlled rectifiers 41, 42, it is apparent that the voltage output of the rectifier circuit 18 may be varied between $e_1$ and $e_1+e_2$ as shown in FIGURE 2. In the specific showing of FIGURE 2, the firing angle for rectifiers 41, 42 is illustrated as being approximately sixty degrees and two hundred and forty degrees, and the rectified output voltage $e_2$ added by transformer 43 to the voltage $e_1$ provided by transformer 15 is illustrated by the shaded portion of the waveform identified by $e_2$ in FIG. 2 in the first half cycle and $e_2$ in the second half cycle. The nature of the voltage output for different firing angles of the silicon controlled rectifiers will be apparent therefrom.

It is, of course, possible to modify this basic arrangement without departing from the scope of the basic invention, and modifications of this basic arrangement will be apparent to parties skilled in the art.

SINGLE-PHASE, FULL-WAVE, CENTER-TAP CIRCUIT ARRANGEMENT

With reference to FIGURE 3, the novel control arrangement employing the principles of the control circuit set forth in FIGURE 1, is shown thereat in an arrangement for controlling a single-phase, full-wave, center-tap rectifier circuit, like components in FIGURE 3 being identified by identification numerals in the first hundred series.

As there shown, source 110 is connected over conductors 111, 112 to the primary winding 113 of main transformer 115. The secondary winding of transformer 115 includes an upper section 114a and a lower section 114b. The upper end terminal of secondary winding 114a is connected over diode 149, filter 126, load 130 and conductor 153 to the center tap 154. The lower end of second section 114b is connected over diode 150, filter 126, load 130 and conductor 153 to center tap 154.

A control firing circuit 134 including input conductors 131, 132 connected across the load controls the firing angle of a pair of silicon controlled rectifiers 141, 142 which are connected between the source 110 and the primary winding 144 on booster transformer 143. The secondary of transformer 143 includes two sections, 145a, 145b. One section 145a is connected in circuit with the upper winding 114a of main transformer 115, the circuit extending over diode 151, filter 126, load resistor 129, conductor 153, center tap 154 and secondary winding 114a to the lower terminal of winding 145a. The second section 145b on transformer 143 is connected in circuit with the lower secondary winding 114b on main transformer 115, the circuit extending from the lower terminal of secondary winding 145b over diode 152, filter 126, load resistor 129, conductor 153, center tap 154 and lower winding 114b to the upper terminal of winding 145b.

The operation of the circuit arrangement is similar to that set forth in FIGURES 1 and 2. Briefly, the primary winding of transformer 115 energizes over conductors 111, 112, and the output of transformer secondary 114a, 114b is coupled over diodes 149, 150 to the load 130 to provide the minimum load voltage requirements, the current path for minimum voltage conditions extending from the upper terminal of winding 114a over diode 149, filter 126 and load resistor 129 to center tap 154 during the positive half cycle, and from the lower terminal of lower winding 114b over diode 150, filter 126, load resistor 129, and conductor 153 to center tap 154 during the negative half cycle.

The control firing circuit 134 effects adjustment of the firing angle of silicon controlled rectifiers 141, 142, in the manner heretofore described to adjust the value of the current which is supplied to primary winding 144 during alternate half cycles of current of source 110.

The resultant output voltage which appears across secondary winding 145a of the booster transformer 143 during the positive half cycle is added to the minimum voltage provided by secondary winding 114a on main transformer 115, diode 149 being operative to conduct the load current from 0° until the firing angle $\theta$, and the rectifier or diode 151 being operative to conduct the load current for the remainder of the positive half cycle. In the negative half cycle, the output voltage which appears across secondary winding 145b during the negative half cycle is added to the minimum voltage output of secondary winding 114b, rectifier or diode 150 conducting from 180° until the firing angle $\pi+\theta$, at which time diode 152 conducts to supply the current requirements of the load 129.

Such manner of conduction shift by the diodes constitutes an important feature of the invention since the total heat dissipation associated with the first pair of rectifiers or diodes 149, 151 will be independent of the firing angle $\theta$ for the given load current, and as a result the heat sink for these two elements can be the same as that which would be normally used for the one rectifier 149 alone if the rectifier were not operated with primary control. This is also true of rectifiers 150 and 152. The addition of the rectifiers 151, 152 therefore does not add to the volume required by the rectifier assembly.

BRIDGE-TYPE POLYPHASE RECTIFIER

With reference, now, to FIGURE 4, the manner in which the novel control circuit may be used in the control of a polyphase rectifier of the bridge type is set forth. As there shown, source 210 comprises a three-phase source having outputs XY, YZ, and ZX for the three different phases respectively. The components for one of the phases, such as phase ZX, are described in detail, and the connections of the components for the two other phases will be readily understood from such description.

Each phase has a main transformer, such as transformer 215ZX in phase ZX, including a primary winding, such as 213ZX, connected across the ZX conductors of source 210, and a secondary winding 214ZX having one end terminal connected over conductor 274 to terminal 275 in bridge rectifier circuit 218, and its second end terminal connected over the secondary winding 214XY and conductor 271 to bridge rectifier terminal 272, and also over secondary winding 214YZ, and conductor 272' to rectifier terminal 273. Thus, in accordance with conventional three-phase current circuit operation, current is delivered through three different paths, each path serving as the return for the other two, and the three current components differ in phase by 120 electrical degrees.

As indicated, the three input terminals 272, 273, 275 of bridge-type rectifier circuit 218 are connected respectively to the secondary windings for the three different phases XY, YZ and ZX of source 210. Each terminal, such as 272, locates the center point for a pair of diodes, such as 256, 258, one of which diodes is connected to the load conductor 223 and the other of which is connected to load conductor 24. Terminal 273 for the second phase YZ is connected to conductors 223, 224 by diodes 260 and 262, and terminal 275 for the third phase ZX is connected to conductors 223, 224 by diodes 264 and 266.

The minimum load voltage is supplied to load 230 by the transformer current paths XY, XZ and ZX over diodes 256, 258; 260, 262; and 264, 266 of rectifier 218 and filter circuit 226. By way of example, the current path for phase ZX extends from source 210 to the primary 213ZX of transformer 215ZX. The voltage output of the secondary winding 214ZX extends over conductor 274, terminal 275, diode 264, filter 226, load resistor 229, conductor 224 and the conducting ones of the diodes 258 or 262 (depending upon the angle of the respective phases) to terminals 272, 273, respectively, and over the secondary winding 214XY, 214XY, to the second terminal of the secondary winding 214YZ for transformer current path ZX. Similar paths may be traced for phases XY and YZ.

In accordance with the basic invention, with a change in the load voltage requirements, auxiliary transformers 243XY, 243YZ and 243ZX effect the provision of an additional voltage output from the source 210 along with the minimum voltage provided by transformers 215XY, 215YZ and 215 ZX.

In achieving such arrangement, a control circuit 234 having input conductors 231, 232 connected across the load provides control signals which determine the firing angle of switches in the control circuits 240XY, 240YZ and 240ZX, respectively, each of which is associated with a different one of the three phases. The control circuit 240ZY for the third phase, for example, comprises a pair of silicon controlled rectifiers 241ZX, 242ZX which are connected in inverse parallel relation between the conductor ZX of source 210 and the primary winding 244ZX of booster transformer 243ZX to control the time period of conduction of current during each cycle to booster transformer 243ZX for its associated phase.

With reference to the operation of a single phase, when the voltage across load resistor 229 is of a value to indicate a requirement for a change in the value of voltage to be supplied by the rectifier circuit 218, the changing voltage which appears over conductors 231, 232 to control circuit 234 results in the provision of an error or difference signal of a correspondingly different value, and circuit 234 responsively effects a corresponding change in the firing angle of silicon controlled rectifiers in each of the circuits 240XY, 240XZ, and 240ZX.

With reference to the third phase, for example, the resultant change in the firing angle of silicon controlled rectifiers 241ZX, 242ZX effects a corresponding change in the period of time during which current flows from the source 210 over conductor Z and the primary winding 244ZX of transformer 243ZX, conductor 246ZX, the conducting one of the silicon controlled rectifiers 241ZX, 242ZX and conductor 276 to the X conductor of source 210.

Such change in time period of current flow through the primary winding 244ZX effects a corresponding adjustment of the voltage output which appears across secondary winding 245ZX in series with secondary winding 214ZX (the winding which supplies the minimum voltage requirement). During the positive half cycle diode 264 conducts until firing angle θ at which time diode 263 conducts the load current for phase ZX. In the negative half cycle, diode 266 conducts until firing angle θ at which time diode 265 conducts. The net voltage output of transformer secondary 214 ZX and 245ZX is applied by rectifiers 264, 266 and 263, 265 over filter 226 to load 230.

The manner in which circuits 240XY and 240YZ control booster transformers 243XY, 243YZ in the provision of an added voltage for the first and second phases XY, YZ, respectively, as required, will be apparent therefrom.

STAR-CONNECTED RECTIFIER CIRCUIT

With reference now to FIGURE 5, there is set forth thereat the manner in which the novel circuit of the invention is utilized in the control of a star-connected rectifier circuit 318. Components illustrated in the earlier FIGURES 1, 3, 4 are identified by similar tens and units digits in the three hundred series for the purpose of simplifying the disclosure.

As shown in FIGURE 5, the three-phase alternating current source 310 provides energizing current for main transformers 315XY, 315YZ, 315ZX, which are connected in the three different phases XY, YZ, ZX, respectively. The output of the three main transformers 315XY, 315YZ, 315ZX, is extended over filter 326 and interphase reactor 385 to load 330. As in the previous embodiment, control firing circuit 334 having input conductors 331, 332 is connected across load resistor 329 to provide control signals over each of three associated output circuits to each of three control circuits 340XY, 340YZ, 340ZX for the three different phases.

In the control of the first phase XY, for example, the control circuit 340XY controls the period of current flow from the source 310 to the primary winding for booster transformer 343XY. The output of the booster transformer, such as 343XY, is connected over a pair of secondary windings 345XY, 345XY' in adding relation with the corresponding output of the main transformer 315XY for the associated phase XY. For purpose of a more simplified description, specific reference is made at this point to the connections for a single phase of the three-phase arrangement, it being apparent therefrom as to the manner in which the remaining phases are connected.

With reference, therefore, to phase XY, it will be apparent that the conductors XY of source 310 are connected to the primary winding 313XY of main transformer 315XY. The secondary of transformer 315XY includes an upper winding 314XY and a lower winding 314XY', each of which is connected to the load 330 over associated oppositely-poled rectifiers 356, 358, respectively. The path for the upper winding 314XY, for example, may be traced from the lower terminal of winding 314XY over diode 356, conductor 323, inductance 327 in filter circuit 326, load resistor 329, conductor 386, the center tap of interphase reactor 385, conductor 387 to the upper terminal of winding 314XY.

Secondary winding 314XY' has its upper terminal connected over diode 358 (which is poled in the direction opposite to diode 356, and therefore conductive in the opposite half cycle of phase XY), over conductor 324, inductance 327, load resistor 329, conductor 386, the center tap of interphase reactor 385, conductor 388 and the lower terminal of winding 314XY'. With a minimum load demand diodes 356, 358 are conductive during alternate half cycles of the phase XY to provide one phase of the required minimum voltage for the load resistor 329. The manner in which transformers 315XY along with 315YZ and 315ZX are operative to provide the minimum voltage requirements for the other phases, will also be apparent therefrom.

Assuming that the load requirements are such that a voltage larger than minimum requirements is to be provided, the changing voltage across load resistor 329 controls an error detector circuit 376 to provide a difference or error signal over amplifier 377 to the phase shift circuits, such as 379XY, for each of the three phases.

As shown in FIGURE 5, only the control for one of the phases is illustrated thereat, it being apparent from such disclosure as to the manner in which the other phases of the control circuit 334 are controlled.

The output signal provided by error detector 376 and amplifier 377 determines the amount of the delay provided by each of the phase shift circuits 379XY, 379YZ, 379ZX. In that the error signal is coupled over a common conductor 378 to the inputs of each of the phase shift units, such as 379XY, the amount of phase displacement provided by control circuits 340XY, 340YZ, and 340ZX in the three different phases will be the same.

The actual pulse output of the phase shift circuits 379XY, 379YZ and 379ZX is displaced by 120 electrical degrees, through means of a pulse transformer in each control (such as transformer 384 for phase XY) which has its primary winding connected to the corresponding phase conductors XY of source 310.

Thus, the primary of transformer 384 for phase XY is connected to conductors XY of source 310, and the secondary of transformer 384 is connected over a gate 389 which is operative to gate a pulse over phase shift network 379XY and pulse amplifier 380 to the primary winding of output transformer 382XY at the start of each half cycle of the XY phase. The gating transformers for the other two phases are operative in a similar manner. Since the outputs for the gating transformers, such as 384, are separated by 120 degrees, and the amount of phase shift introduced into a control signal for the different phases is the same, the signals coupled to the output transformers, such as 382XY, will remain 120 degrees apart.

The secondary of output transformer 382XY includes an upper winding 383 which is coupled over conductors 335XY, 336XY to a first silicon controlled rectifier 341XY, whereby, with application of a pulse over output conductors 335XY, 336XY in the first half cycle of the phase XY, silicon controlled rectifier 341XY will conduct current from the source 310 to the input circuit for its associated booster transformer 343XY. Output conductors 337XY, 338XY of control firing circuit 334 control associated silicon controlled rectifier 342XY in circuit 340XY to operate in the same relative time period in the second half cycle of phase XY.

With operation of silicon controlled rectifier 341XY, a path is completed from source 310 over conductor X, silicon controlled rectifier 341XY, the primary winding 344XY of transformer 345XY and conductor Y of source 310. As a result of the current flow through the primary winding 344XY and the resultant induced voltage in winding 345XY, diode 355 conducts, diode 356 is cut off, and the voltage provided by transformer winding 314XY and 345XY over diode 355 to load resistor 329 is increased by an amount related to the period of conduction of silicon controlled rectifiers 341XY during such cycle. Silicon controlled rectifier 342XY is controlled in a similar manner in the negative half cycle, and the resultant voltage induced in transformer winding 345XY' effects conduction of diode 357 (cutoff of diode 358) and the provision of the second of the voltage outputs of transformer windings 314XY' and 345XY', the value of the total voltage being determined by the period of conduction of silicon controlled rectifier 342XY in the second half cycle.

The manner in which the control firing circuit 334 effects operation of control circuits 340YZ and 340ZX for the respective phases YZ and ZX to effect the provision of added voltage output over diodes 359, 361 for phase YZ and over diodes 363, 365 for phase ZX will be apparent from such disclosure.

CONCLUSION

There has been set forth hereinbefore novel power supply circuits in which silicon controlled rectifiers, thyratrons, ignitrons or the like may be used to control the voltage output of a rectifier circuit over that portion of the output voltage required to satisfy the equipment specifications. The basic concept of the invention is of such flexibility that it is readily adaptable for use in controlling single phase and polyphase rectifiers connected according to a number of well known configurations.

The reduction in size of the overall assembly resulting from the use of the components in this novel manner enables the manufacture of the complete system at a greatly reduced cost. In addition, the circuitry lends itself to the protection of the higher cost controlling elements used in the circuits from damage by excessive currents in a simple and inexpensive manner. An added feature of the invention is the manner in which such improved form of control and reliable operation is achieved without requiring an increase in size of the heat sink required for the semiconductor elements. As a result, such improved form of control can be effected without adding to the volume and with a reduced cost of the overall rectifier assembly.

What is claimed is:

1. In a power supply circuit for providing a controlled direct current output from an alternating current source to a load including a rectifier circuit, a first supply circuit including a main transformer means for supplying a first energizing voltage from said source to said rectifier circuit, connecting means for connecting the output of said rectifier circuit to a load, a second supply circuit including booster transformer means for supplying an additional voltage output from said source to said rectifier circuit, and a pair of controlled rectifier devices connected in inverse parallel relation to control energization of said booster transformer means from said source means, a control circuit connected between said load and said controlled rectifier devices for adjusting the firing angle of said controlled rectifier devices in each cycle to a value which maintains a constant output for said load, and means in said rectifier circuit operative to conduct the transformer secondary current over said main transformer and said booster transformer means in series to said connecting means in response only to switching of either one of said controlled rectifier devices to the conductive state.

2. In a power supply circuit for providing a controlled direct current voltage output to a load from an alternating current source including a rectifier circuit having at least a first, a second, a third and a fourth rectifier device, a first supply circuit connected to said source for supplying a first energizing voltage to said first and second rectifier devices, said first and second rectifier devices being connected to operate on alternate half cycles, a second supply circuit including booster transformer means for supplying a second voltage to said third and fourth rectifiers in additive relation to said first voltage to control said third and fourth rectifiers to conduct and thereby cut off said first and second rectifiers, a pair of controlled switching devices connected to control energization of said booster transformer means from said alternating current source, each of said controlled switching devices being operative in a different half cycle, and a control circuit connected between said load and said switching devices for controlling the firing angle $\theta$ of said controlled switching devices to different values in their respective half cycles to thereby correspondingly adjust the half period average voltage output of said booster transformer means to different values, said first and second rectifier devices being operative to conduct current from said first supply means to said load during the nonconducting periods of said controlled switching devices, said third and fourth rectifier devices each being cut off by the impedance of said booster transformer means whenever its associated one of said controlled switching devices is nonconductive, and being connected to conduct the current to said load whenever its associated one of said controlled switching devices is switched to the conductive state.

3. In a power supply circuit for providing a controlled direct current voltage output to a load from an alternating current source, a first supply circuit including a main transformer having a center tapped secondary winding and a first plurality of rectifier means, and output means for supplying an energizing voltage from said secondary winding to said first plurality of rectifier means in alternate half cycles of said source alternating current, a second supply circuit including a second plurality of rectifier means, and booster transformer means having at least a pair of windings for supplying voltage outputs from said source to different ones of said second plurality of rectifier means in alternate half cycles of said source current, a pair of controlled rectifier switches connected to control energization of said booster transformer means from said source, a control circuit connected between said load and said rectifier switches for selectively adjusting the conducting period and the cutoff period of said controlled rectifier switches in their respective half cycles, said second plurality of rectifier means being operative to inhibit conduction by said first plurality of rectifier means and to establish series current flow over the secondary windings of said main and booster transformer means only during the period of current conduction by said controlled rectifier switches.

4. In a power supply circuit for providing a controlled direct current output to a load from a polyphase alternating current source including a rectifier circuit, a plurality of main supply circuits, each of which is connected to supply an energizing voltage for a different phase from said source to said rectifier circuit, a plurality of booster supply means, each of which includes a booster transformer connected to provide a booster voltage output to said rectifier circuit for a different phase, at least one controlled switching device connected to control energization of a booster transformer in at least one booster supply means from said alternating current source, a control circuit connected between said load and said controlled switching device to control the firing angle of said controlled switching device, and means in said rectifier circuit operative to conduct the current output of said main transformer and said booster transformer for a phase in series to said load only in response to switching of said controlled switching device to the conductive state.

5. In a power supply circuit for providing a controlled direct current voltage output from a polyphase alternating current source including a rectifier circuit, a plurality of main supply circuits, each of which is connected to supply an energizing voltage for a different phase from said source to said rectifier circuit, a plurality of booster supply circuits, each of which is connected to provide a booster output voltage from said source to said rectifier circuit for a different phase, and at least a pair of controlled switching devices for each phase connected to control energization of the booster supply circuit for its phase from said alternating current source, means for connecting the output of said rectifier circuit to a load, error detection means for providing signals representative of variation of the load voltage from a predetermined value, and a control circuit connected between said error detection means and said controlled switching devices for controlling the firing angle of said controlled switching devices to provide a constant voltage output for said load, and first means in said rectifier circuit for conducting the current over one of said main supply circuits and its associated booster supply circuit in series to said load only during the periods of current conduction by said controlled switching devices, and a second means for at other times conducting the current output of said one main supply circuit to said load independent of said first means.

6. In a power supply circuit for providing a controlled direct current voltage output to a load from a polyphase alternating current source including a rectifier circuit, a plurality of main supply circuits, each of which is connected to supply an energizing voltage for a different phase from said source to said rectifier circuit, a plurality of booster supply circuits, each of which includes a booster transformer connected to provide a booster voltage output to said rectifier circuit for a different phase, a plurality of switching circuits, each of which includes a pair of controlled rectifier devices connected in inverse parallel relation to control energization of a different one of said booster supply circuits from said alternating current source, and a control circuit connected between said load and said controlled rectifier devices for adjusting the conducting period of said controlled rectifier devices for said different booster supply circuits to thereby control the total voltage supplied to said rectifier circuit in the different phases, said rectifier circuit including at least one rectifier device for a main supply circuit for one phase and a second rectifier device for the booster supply circuit for said one phase, said second rectifier device for said one phase being conductive and said one rectifier being nonconductive whenever an associated one of said controlled rectifier devices for said one phase is conductive, and said first rectifier device being connected to effect conduction of current to said load and said second rectifier device being inhibited by the booster transformer for said one phase whenever said associated controlled rectifier device is nonconductive.

7. In a power supply circuit for providing a controlled direct current voltage output to a load from a polyphase alternating current source including a rectifier circuit, means for controlling the voltage output to one phase at least including a main supply circuit for supplying an energizing voltage from said source to said rectifier circuit, having a main transformer means connected to provide a predetermined voltage output for said one phase, a second supply circuit including booster transformer means connected to said one phase of said source to supply an additional voltage output from said source to said rectifier circuit for said one phase, a pair of controlled rectifier devices connected to control the period of energization of said booster transformer means for said one phase from said alternating current source, a control circuit connected between said load and said controlled rectifier devices for controlling the conducting period of said controlled rectifier devices in each cycle, said rectifier circuit including a first unilateral conducting means for providing direct current to said load for half cycles of said one phase, means connecting the voltage output of said main supply circuit for said half cycles of said one phase for conduction by said first unilateral conducting means to said load, a second unilateral conducting means for providing direct current to said load for said half cycles of said one phase, said second unilateral conducting means being connected to be cut off by the impedance of said booster transformer means for said one phase during the nonconducting period of one of said controlled rectifier devices, and means connecting the voltage output of said second supply circuit during said half cycle for conduction by said second unilateral conducting means to said load, said second unilateral conducting means being operative responsive only to conduction by said one controlled rectifier device to effect cutoff of said first unilateral conducting means, and conduction of current to said load independent of said first unilateral conducting means.

8. In a power supply circuit for providing a controlled direct current voltage output to a load from an alternating current source including a rectifier circuit having a plurality of rectifier devices, a first supply circuit including a first transformer means for supplying a first voltage output from said source to said rectifier circuit, said first transformer means being operative at a relatively high flux density, a first set of said rectifier devices being operative to supply said output of said first supply circuit to said load, a second supply circuit including a booster transformer means for supplying an additional voltage output from said source to said rectifier circuit in addition to said first voltage output, said booster transformer means being operative at a flux density of a relatively lower value, at least a pair of controlled switching devices connected to control energization of said booster transformer means from said source, a control circuit connected between said load and said controlled switching devices for controlling the firing angle of said controlled switching devices in each cycle of said source current, and a second set of rectifier devices in said rectifier circuit operative to effect current flow over the secondary of said booster transformer means and said first transformer means to said load in series only during periods of conduction by said controlled switching devices, and to inhibit conduction by at least certain rectifier devices in said first set in response to conduction by said controlled switching devices.

9. In a power supply circuit for providing a controlled direct current voltage output to a load from a polyphase alternating current source including a rectifier circuit, a plurality of main supply circuits including three main transformers, each having a primary winding, means connecting said main primary windings in a delta configuration, a pair of secondary windings on each of said transformers, each of which is connected to supply an energizing voltage from said source to said rectifier circuit, a plurality of booster supply circuits each of which includes a booster transformer having a primary winding, means connecting said booster primary windings in delta configuration, each booster transformer including two secondary windings, each of which is connected to provide a booster voltage output to said rectifier circuit, at least one controlled semiconductor switching device for each booster transformer connected to control energization of its booster transformer from said source, a control circuit connected between said load and said controlled semiconductor switching device to adjust the firing angle of said controlled semiconductor switching device to different values, and means in said rectifier circuit for shunting load current from flow over a booster transformer secondary winding to said rectifier circuit during cutoff of current to the booster primary by its associated controlled semiconductor switching device.

10. In a power supply circuit for providing a controlled direct current voltage output from an alternating current source including a rectifier circuit, a first supply circuit for supplying an energizing voltage from said source to said rectifier circuit, connecting means for connecting the output of said rectifier circuit to a load, booster transformer means for supplying an additional voltage output from said source to said rectifier circuit, at least one controlled switching device connected to control energization of said booster transformer means from said source, a control circuit connected between said load and said controlled switching device for adjusting the firing angle $\theta$ of said controlled switching device to different values to provide a correspondingly different half period average voltage output by said booster transformer means to said rectifier circuit, a first means in said rectifier circuit for normally supplying current from the secondary winding of said main transformer to said connecting means including a first set of rectifier means, and a second means in said rectifier circuit for supplying current from the secondary winding of said booster transformer means to said connecting means, said first means including said first set of rectifier means being connected to conduct load current to said connecting means during current cutoff by said controlled switching device, and said second means being operative to effect current flow in series over said booster secondary winding and said main transformer secondary winding in response to operation by said controlled switching device to the conductive state, and to inhibit current flow over said first set of rectifier means.

11. In a power supply circuit for providing a controlled direct current voltage output from an alternating current source including a rectifier circuit, a supply circuit including main transformer means for supplying an energizing voltage from said source to said rectifier circuit, connecting means for connecting the output of said rectifier circuit to a load, error detection means connected to said load for providing signals representative of variation of the load voltage from a predetermined value, booster transformer means for supplying an additional voltage output from said source to said rectifier circuit, a pair of switching devices connected in inverse parallel relation to control current flow and current cutoff from said source to said booster transformer means, and a control circuit connected between said error detection means and said switching devices responsive to said error detection signals to control the firing angle $\theta$ of said switching devices in alternate half cycles to provide a constant voltage output to said load, first means in said rectifier circuit connected to conduct current from the secondary winding of said main transformer means to said connecting means during periods of nonconduction of said switching devices, and second means in said rectifier circuit operative responsive to the conducting periods of said switching devices to effect cutoff of the current flow over said first means, and to effect conduction of the current flow over said booster secondary winding means and said main transformer secondary winding means in series to said load.

12. In a power supply circuit for providing a controlled direct current output from an alternating current source including a first supply circuit including a main transformer means for normally deriving an energizing voltage from said source, at least a first rectifier device for connecting a secondary winding of said main transformer means to a load, a second supply circuit including a booster transformer means for supplying an additional voltage output from said source, at least a second rectifier device for connecting the secondary winding of said booster transformer means to said load, at least one controlled switching device connected to control energization of said second supply circuit from said source, control circuit means connected between said load and said switching device for controlling the conducting period of said controlled switching device in each cycle, said first rectifier device being connected to conduct current from said main transformer means to said load during cutoff of said controlled switching device, and said second rectifier device being connected to conduct current to said load from said main and booster transformer means in response to conduction by said controlled switching device, and to inhibit conduction by said first rectifier device.

13. In a power supply circuit for providing a controlled direct current output to a load from a multi-phase alternating current source, a first supply circuit including main transformer means having a secondary winding for each phase, one phase at least having a first rectifier means for supplying an energizing voltage from the main transformer secondary winding for such phase over associated output means, a second supply circuit including booster transformer means having a secondary winding for each phase, the phases of said booster transformer means corresponding to the phases of said main transformer, the phase of the one booster transformer means corresponding to said one phase of said main transformer means having a second rectifier means for supplying an additional voltage output from its associated secondary winding on said booster transformer means to said output means, at least one controlled switch means connected to control energization of said one booster transformer means from said source, a control circuit connected between said load and said switch means for selectively adjusting the conducting period and the nonconducting period of said controlled switch means, said first rectifier means being connected to conduct the current output of said main transformer means to said load during the nonconducting periods of said controlled switch means, said second rectifier means being connected to inhibit conduction by said first rectifier means and to establish series current flow over said secondary windings of said main and booster transformer means for said one phase in response to current conduction by said controlled switch means.

14. In a power supply circuit for providing a controlled direct current output to a load from an alternating current source including a rectifier circuit having at least a first, a second and a third input terminal, a first supply means connected to said source for supplying an energizing voltage between said first and second input terminal of said rectifier circuit, first means in said rectifier circuit for effecting current flow from said first supply circuit over said first and second input terminals to said load, a second supply means for supplying a voltage between said second and third input terminals of said rectifier circuit, at least one controlled rectifier device connected to control energization of said second supply means from said source, a control circuit connected between said load and said controlled rectifier device for controlling the firing angle of said controlled rectifier device in each cycle, and second means in said rectifier circuit for effecting current flow from said first and second supply means over said first and third terminals whenever said controlled rectifier device is conducting, and for controlling said first means to block the current flow over said second terminal during such conduction by said controlled rectifier device.

15. In a power supply circuit for providing a controlled direct current output to a load from an alternating current source including a rectifier circuit having at least a first, a second, and a third input terminal, a first supply means connected to said source for supplying an energizing voltage between said first and second input terminals for said rectifier circuit, a second supply means for supplying a voltage between the second and third terminals of said rectifier circuit, at least one controlled switching device connected to control current flow and current cutoff from said source to said second supply circuit, a control circuit connected between said load and said controlled switching device for controlling the firing angle of said switching device, means in said rectifier circuit connected to conduct current over said first and second terminals during the periods said controlled switching device is in the nonconductive state, and means in said rectifier circuit operative to enable current flow over only said first and third terminals in response to operation of said controlled switching device to the conductive state and to inhibit current flow over said second terminal.

16. A circuit arrangement, comprising rectifying means having an input and an output; input means for applying an input voltage to the input of said rectifying means; output means for deriving an output voltage from the output of said rectifying means; voltage means for providing a voltage different from said input and output voltages; a diode connected in series circuit arrangement with said voltage means, said series circuit arrangement being connected across said rectifying means, said diode being connected with a polarity which opposes forward current flow in said rectifying means and the voltage provided by said voltage means having a polarity which opposes forward current flow in said rectifying means, such that the voltage developed therein has a polarity which opposes forward current flow in said rectifying means during the conducting half cycle of said rectifying means.

17. A circuit arrangement as claimed in claim 16, wherein said voltage means comprises variable voltage means for providing a variable voltage.

18. A circuit arrangement as claimed in claim 16, further comprising means coupled to said voltage means for controlling the magnitude of said voltage in accordance with said output voltage thereby controlling the magnitude of said output voltage.

19. A circuit arrangement as claimed in claim 16, wherein said voltage means comprises alternating voltage means for providing an alternating voltage.

20. A circuit arrangement as claimed in claim 16, further comprising transformer means having an input winding connected to said input means and a secondary winding comprising said winding, a silicon controlled rectifier connected in series with the input winding of said transformer means, said silicon controlled rectifier having a gate for controlling the conductive condition thereof, and control means having input means connected to said output means and output means connected to the gate of said silicon controlled rectifier for controlling the conductive condition of said silicon controlled rectifier thereby cntrolling the magnitude of said output voltage.

21. A circuit arrangement, comprising a full-wave rectifier having an input comprising a first transformer having an input winding and a secondary winding, an output and a plurality of rectifying means connected to the secondary winding of said first transformer; input means for applying an input voltage to the input winding of said first transformer; output means for deriving an output voltage from the output of said rectifier; a second transformer having an input winding connected to the input winding of said first transformer and a plurality of secondary windings; and a plurality of diodes each connected in series circuit arrangement with a corresponding one of said secondary windings, each of the series circuit arrangements being connected across a corresponding one of the rectifying means of said rectifier, each of said diodes being connected with a polarity which opposes forward current flow in the corresponding rectifying means and each of said secondary windings being wound in a manner such that the voltage developed therein has a polarity which opposes forward current flow in the corresponding rectifying means during the conducting half cycle of said rectifying means.

22. A circuit arrangement as claimed in claim 21, further comprising silicon controlled rectifier means connected in series with the input winding of said second transformer, said silicon controlled rectifier means having gate means for controlling the conductive condition thereof, and control means having input means connected to said output means and output means connected to the gate means of said silicon controlled rectifier means for controlling the conductive condition of said silicon controlled rectifier means in accordance with said output voltage thereby controlling the magnitude of said output voltage.

23. A circuit arrangement as claimed in claim 21, wherein said full-wave rectifier comprises a multiphase rectifier.

References Cited

UNITED STATES PATENTS

| | | | |
|---|---|---|---|
| 3,270,270 | 8/1966 | Yenisey | 321—24 X |
| 2,129,890 | 9/1938 | Trucksess | 321—20 |
| 2,349,685 | 5/1944 | Trucksess | 307—7 |
| 2,978,633 | 4/1961 | Medlar | 323—89 |
| 3,205,426 | 9/1965 | Mills | 321—18 |
| 3,263,157 | 7/1966 | Klien | 323—22 |

FOREIGN PATENTS 718,594  11/1954  Great Britain.

JOHN F. COUCH, Primary Examiner

G. GOLDBERG, Assistant Examiner

U.S. Cl. X.R.

320—22, 39, 50; 321—18, 20, 27; 323—22